United States Patent [19]

Black et al.

[11] Patent Number: 6,019,703

[45] Date of Patent: Feb. 1, 2000

[54] TRANSMISSION ASSEMBLY FOR VEHICLE WITH TORQUE CONVERTER CLUTCH AND METHOD FOR ENGAGING THIS CLUTCH

[75] Inventors: Daniel H. Black, Shelby Township; David Parenti, Waterford, both of Mich.

[73] Assignee: DaimlerChrysler Corporation, Auburn Hills, Mich.

[21] Appl. No.: 09/273,670

[22] Filed: Mar. 23, 1999

[51] Int. Cl.[7] .................................................. F16H 61/14
[52] U.S. Cl. .......................... 477/168; 477/76; 477/86; 477/62; 477/174; 477/169; 192/82 T
[58] Field of Search ................................. 477/62, 65, 76, 477/168, 169, 86; 192/82 T, 3.63

[56] References Cited

U.S. PATENT DOCUMENTS

| | | |
|---|---|---|
| 3,824,867 | 7/1974 | Brooks . |
| 4,289,048 | 9/1981 | Mikel et al. . |
| 4,495,576 | 1/1985 | Ito . |
| 4,872,540 | 10/1989 | Sekine et al. . |
| 4,993,527 | 2/1991 | Benford et al. . |
| 5,050,717 | 9/1991 | Shibayama ............................ 477/65 X |
| 5,054,590 | 10/1991 | Paulsen . |
| 5,125,487 | 6/1992 | Hodge . |
| 5,186,294 | 2/1993 | Nitz et al. . |
| 5,251,734 | 10/1993 | Benford et al. . |
| 5,347,885 | 9/1994 | Taga et al. ............................ 477/76 X |
| 5,475,590 | 12/1995 | Palansky et al. . |
| 5,669,850 | 9/1997 | Dourra et al. . |
| 5,719,768 | 2/1998 | Tashiro et al. . |
| 5,752,895 | 5/1998 | Sugiyama et al. ...................... 477/169 |
| 5,792,024 | 8/1998 | Yeo . |
| 5,833,579 | 11/1998 | Ghil ...................................... 477/169 |

Primary Examiner—Charles A. Marmor
Assistant Examiner—Ankur Parekh
Attorney, Agent, or Firm—Kenneth H. MacLean

[57] ABSTRACT

A transmission assembly and method for controlling a torque converter of a transmission assembly in which an electronic controller monitors the load on the vehicle power train in addition to a number of other vehicle dynamics, including the currently engaged gear ratio and the temperature of the transmission fluid. The electronic controller is operable for causing the activation of the converter clutch in response to a number of predetermined operating conditions, one of which includes the operation of the vehicle when the fluid in the torque converter exceeds a predetermined temperature and the vehicle power train is operated under a heavy load for a period of time which exceeds a predetermined time interval. Engagement of the converter clutch during such times inhibits relative rotation between the torque converter turbine and impeller, improving fuel economy and preventing the torque converter from generating a substantial amount of heat. The use of the time interval prevents the engagement of the converter clutch during transient operating conditions and eliminates concerns relating to the "driveability" of the vehicle.

14 Claims, 2 Drawing Sheets

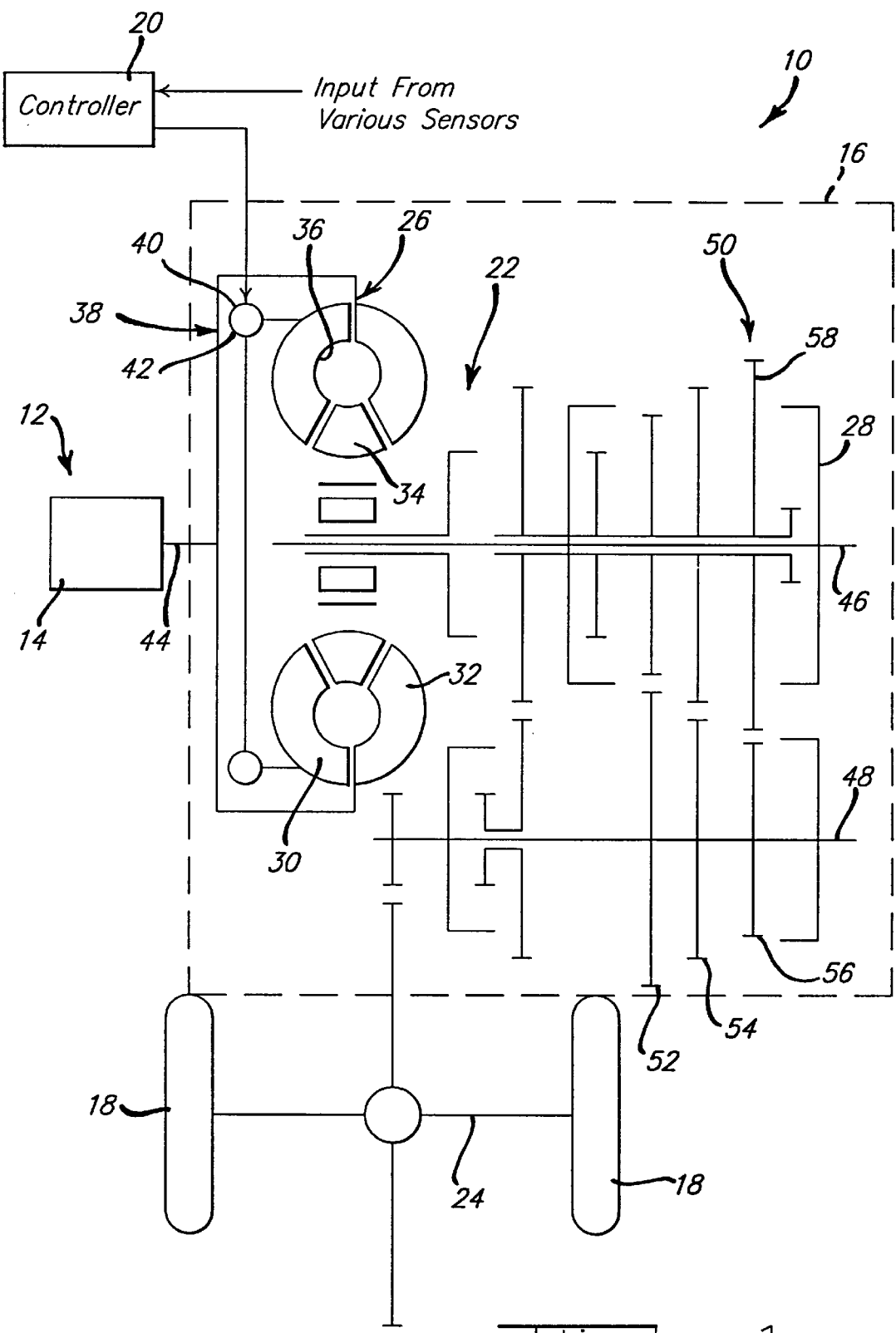

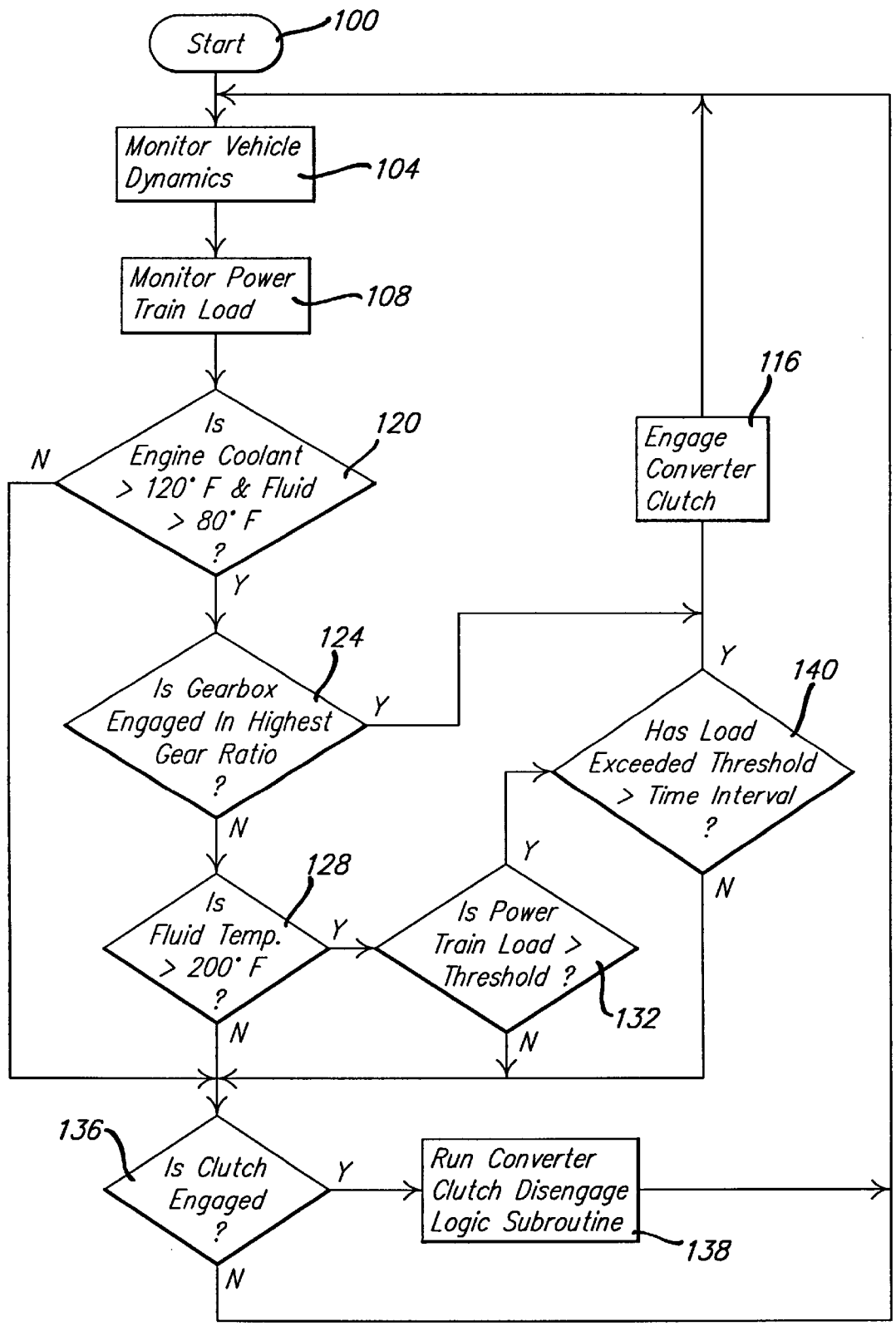

TRANSMISSION ASSEMBLY FOR VEHICLE WITH TORQUE CONVERTER CLUTCH AND METHOD FOR ENGAGING THIS CLUTCH

BACKGROUND OF THE INVENTION

1. Technical Field

The present invention relates generally to vehicle power trains and more particularly to a transmission assembly which utilizes an improved method for controlling the engagement of a torque converter clutch.

2. Discussion

Modern automotive vehicles typically include a power plant, such as an internal combustion engine, a power train, and wheels. The power plant converts fuel into rotational energy having torque and speed characteristics. The power train is operable for transmitting the rotational energy from the power plant to the wheels to propel the vehicle.

The main component of the power train is generally referred to as a "transmission assembly". The transmission assembly is operable for converting the speed and torque produced by the power plant in accordance with the tractive-power demand of the vehicle. A conventional transmission assembly typically includes a hydrodynamic torque converter and a gearbox. The torque converter transfers engine torque from the engine crankshaft to a rotatable input member of the gearbox through fluid-flow forces.

Generally speaking, the torque converter includes a fluid, an impeller which is coupled for rotation with the engine crankshaft, a turbine coupled for rotation with the gearbox input shaft, a stator for redirecting fluid flow from the turbine side to the impeller to effectively multiply engine torque, and a converter clutch operable for "locking" the impeller and turbine such that they rotate at the same speed (i.e., engine crankshaft speed). A thorough description of general automatic transmission design principals may be found in "Fundamentals of Automatic Transmissions and Transaxles," Chrysler Corporation Training Manual No. TM-508A. An additional description of torque converters may be found in U.S. Pat. No. 4,289,048, entitled "Lock-up System for Torque Converter," issued on Sep. 15, 1981 to Mikel, et al. which is hereby incorporated by reference.

Modernly, vehicle power trains have been equipped with electronically controlled converter clutches in an effort to optimize the efficiency and performance of the power train, as well as reduce the operating temperature of the fluid in the torque converter. In the absence of extraordinary operating conditions, the prior art electronic converter clutch control (ECCC) methods are typically used to engage the converter clutch when a vehicle transmission is engaged in its highest gear ratio (e.g., "fourth gear" in a transmission having four gear ratios). The use of the prior art ECCC methods in the lower gear ratios, however, has produced undesirable "driveability" issues. These issues stem from the typically transient use of the lower gear ratios and the fact that vehicles are seldom operated while these gear ratios are employed. Compounding matters is the fact that the power train is typically operating at relatively light loads while these gear ratios are in use so that the transmission fluid is typically exposed to low to moderate levels of heat.

However, the load on the power train substantially increases where the vehicle is operated up a steep incline or is used to tow an object. Despite the relative rarity of these situations, they can significantly increase the temperature of the transmission fluid and as such, the vehicle must be equipped to sufficiently reject this heat. This has led to the use of oversized cooling systems and optional boost coolers to provide sufficient cooling capacity to reject the additional heat generated when operating a vehicle under these conditions. This solution, however, is relatively costly.

Therefore, there remains a need in the art for an improved ECCC method that may be employed with lower gear ratios to reduce the amount of heat produced during periods where the power train is heavily loaded and which does not impact the driveability of the vehicle. Employment of an improved ECCC method while the lower gear ratios of a gearbox were engaged would also improve the fuel economy of the vehicle as the inefficiencies associated with the slip between the impeller and the turbine would be eliminated.

SUMMARY OF THE INVENTION

It is therefore one object of the present invention to provide an improved method for controlling a torque converter clutch. It is another object of the present invention to provide a transmission assembly which employs an improved method for controlling a torque converter clutch.

It is a more specific object of the present invention to provide a method for controlling a torque converter clutch that may be employed when the vehicle transmission is operated at lower gear ratios.

It is another specific object of the present invention to provide a method for controlling a torque converter clutch that may be employed to reduce the heat produced during the operation of the torque converter while the vehicle power train is operated under a heavy load.

To achieve the foregoing objectives, the transmission assembly and method of the present invention utilize an electronic controller to monitor the load on the vehicle power train in addition to a number of other vehicle dynamics, including the currently engaged gear ratio and the temperature of the transmission fluid. The electronic controller is operable for causing the activation of the converter clutch in response to a number of predetermined operating conditions, one of which includes the operation of the vehicle when the fluid in the torque converter exceeds a predetermined temperature and the vehicle power train is operated under a heavy load for a period of time which exceeds a predetermined time interval. Engagement of the converter clutch during such times inhibits relative rotation between the torque converter turbine and impeller, improving fuel economy and preventing the torque converter from generating a substantial amount of heat. The use of the time interval prevents the engagement of the converter clutch during transient operating conditions and eliminates concerns relating to the "driveability" of the vehicle.

Additional advantages and features of the present invention will become apparent from the subsequent description and the appended claims, taken in conjunction with the accompanying drawings.

BRIEF DESCRIPTION OF THE DRAWINGS

FIG. 1 is a schematic diagram of a vehicle employing a transmission assembly construction in accordance with the teachings of the present invention;

FIG. 2 is a diagram in flowchart format of the method of the present invention.

DETAILED DESCRIPTION OF THE PREFERRED EMBODIMENT

Referring to FIG. 1 of the drawings, an automotive vehicle is generally indicated by reference numeral 10.

Vehicle 10 includes a power plant 12, such as an internal combustion engine 14, a power train 16, a plurality of wheels 18, an electronic controller 20 and a plurality of sensors (not shown) for monitoring various vehicle dynamics. Power train 16 includes a transmission assembly 22 and a driveline 24 and is operable for transmitting the rotational energy from engine 14 to wheels 18 to propel vehicle 10.

Transmission assembly 22 includes a hydrodynamic torque converter 26 and a conventional gearbox 28. Torque converter 26 includes a turbine 30, an impeller 32, a stator 34, a hydrodynamic fluid 36, and an electronically controlled lock-up clutch 38 which includes an electronic actuator 40 and a lockup clutch 42. Turbine 30 is conventionally coupled for rotation with the crankshaft 44 of engine 14. Impeller 32 is conventionally coupled for rotation with the input shaft 46 of gearbox 28. Electronically controlled lock-up clutch 38 is selectively positionable between a disengaged position wherein relative rotation between turbine 30 and impeller is permitted, and an engaged position wherein relative rotation between turbine 30 and impeller is inhibited.

As is well known in the art, the disengaged position is preferred when the speed of vehicle 10 is transient, such as during "city" driving conditions, to improve the "driveability factors" of vehicle 10, including responsiveness to changes in the throttle position. The fluid connection between the engine 14 and gearbox 28 provided by the disengaged position eliminates the harshness and "clunking" associated with gearbox 28 back-lash when the throttle is "tipped-out". Similarly, the disengaged position allows the vehicle to accelerate smoothly when the throttle is "tipped-in". As is also well known in the art, engaged position is preferred when the speed of vehicle 10 is constant, such as during "highway" driving conditions where a "cruise control" feature is used. Since relative rotation between turbine 30 and impeller 32 is inhibited when lock-up clutch 42 is in engaged position, hydrodynamic losses are eliminated, allowing vehicle 10 to perform with improved fuel economy, as well as allowing torque converter 26 to operate without generating a substantial amount of heat.

Rotational energy transmitted to impeller 32 is transmitted to gearbox 28 through input shaft 46. Gearbox 28 includes an output shaft 48 and a plurality of selectably engagable gear ratios 50 which are operable for rotating output shaft 48 at a predetermined range of rotational speeds relative to the speed of input shaft 46. In the particular embodiment illustrated, gearbox 28 is shown to include a first gear 52 having a gear ratio with high torque and low speed characteristics, a second gear 54 having a first intermediate gear ratio with a first intermediate set of torque and speed characteristics, a third gear 56 having a second intermediate gear ratio with a second intermediate set of torque and speed characteristics, and a fourth gear 58 having gear ratio with low torque and high speed characteristics. It will be understood, however, that the particular embodiment is provided for purposes of illustration only and that the present invention is susceptible for use with transmission assemblies having gearboxes of different configurations.

Sensors are positioned throughout vehicle 10 and are operable for generating signals in response to the relevant vehicle dynamics. These dynamics may include the speed of vehicle 10, the rotational speed of turbine 30, the rotational speed of impeller 32, the temperature of fluid 36, the temperature of the engine coolant (not shown), and the particular gear ratio 50 engaged. Electronic controller 20 is coupled to sensors and receives their signals. Electronic controller 20 preferably includes Grade Hunting Logic as described in commonly assigned U.S. Pat. No. 5,669,850 to Dourra et al., the disclosure of which is hereby incorporated by reference as if fully set forth herein. Briefly, Grade Hunting Logic (also known as Shift Hunting Logic) has previously been used to determine the times at which a vehicle power train is operated under heavy loads. This is accomplished by determining the amount of torque required to maintain the vehicle at a predetermined speed in a first gear ratio, determining a maximum torque available if the gearbox 28 were to be upshifted (i.e., placed in the next highest gear ratio), and inhibiting the upshift in situations where the maximum available torque is insufficient to maintain the speed of the vehicle if the upshift was made. However, electronic controller 20 may employ any method for sensing when power train 16 is operating under a heavy load (i.e., a load which has exceeded a predetermined level).

Electronic controller 20 is coupled to actuator 40 and is operable for causing actuator 40 to engage lock-up clutch 42 in response to the operation of vehicle at any one of a number of predetermined conditions. According to the method of the present invention, one of these conditions includes the operation of vehicle 10 such that:

gearbox 28 is engaged in a gear ratio other than the highest gear ratio (i.e., not fourth gear);

the temperature of fluid 36 is above a predetermined first temperature; and power train 16 has been operated under a load exceeding a predetermined level for a time interval that has exceeded a predetermined time period.

If the load on power train 16 is ascertained with a high degree of accuracy, lock-up clutch 42 is preferably engaged immediately upon sensing that the load on power train 16 has exceeded a predetermined level (i.e., predetermined time period=0) so as to maximize the cooling effect provided by the method of the present invention. However, depending on the process by which the load on power train 16 is determined, it may be necessary to delay the engagement of lock-up clutch 42 for a predetermined time period so as to eliminate the possibility that its engagement would cause driveability problems. Accordingly, testing has shown good results with such time intervals ranging from approximately 0 to 15 seconds, with the duration of approximately 2 to 6 seconds providing optimal balance between the conflicting factors of performance, cooling capacity and driveability. Testing has also shown good results with fluid temperature thresholds ranging between approximately 180 to 240° F., with optimal performance between 190 to 210° F.

Other conventional predetermined conditions may also be included in the converter clutch control methodology, such as the operation of engine 14 at a speed exceeding a predetermined rate or the operation of vehicle 10 when fluid 36 has exceeded a second, higher temperature threshold.

With reference to FIG. 2, the methodology of the present invention is shown in flowchart form. The methodology is entered through bubble 100 where it progresses to block 104. At block 104, the methodology monitors the various vehicle dynamics which may include the speed of vehicle 10, the rotational speed of turbine 30, the rotational speed of impeller 32, the temperature of fluid 36, the temperature of the engine coolant, and the particular gear ratio 50 engaged, as explained above.

The methodology then proceeds to block 108 where the load on power train 16 is monitored. As mentioned above, while any one of several methods may be used to monitor the load on power train 16, it is preferred that this step employ Grade Hunting Logic to determine when power train is under a heavy load. This preference is due in large part to the fact that the additional sensors and/or logic that would be necessary with the other load monitoring methods is not needed with Grade Hunting Logic.

The methodology then proceeds to decision block 120 where electronic controller 20 determines whether the temperatures of the engine coolant and fluid 36 have exceeded a predetermined engine coolant threshold temperature and a first predetermined fluid threshold temperature, respectively. In the example illustrated, the predetermined engine coolant threshold temperature is approximately 120° F. and the first predetermined fluid threshold temperature is approximately 80° F. If both of these thresholds have been exceeded, the methodology proceeds to decision block 124. If at least one of these thresholds has not been exceeded, the methodology proceeds to decision block 136.

At decision block 124, the methodology determines if gearbox 28 is engaged in its highest gear ratio 50 (i.e., fourth gear 56). If gearbox 28 is in its highest gear ratio 50, the methodology proceeds to block 116 where electronic controller 20 causes electronically controlled lock-up clutch 38 to shift to the engaged position, inhibiting relative rotation between turbine 30 and impeller 32. The methodology then loops back to block 104. If gearbox 28 is not in its highest gear ratio, the methodology proceeds to decision block 128.

At decision block 128, electronic controller 20 determines if the temperature of fluid 36 has exceeded a second predetermined fluid temperature threshold. Generally speaking, the second predetermined fluid temperature threshold is lower than the first predetermined fluid temperature threshold. In the example illustrated, the second predetermined fluid temperature threshold is approximately 175 to 225° F. and preferably between approximately 190 to 210° F. If the temperature of fluid 36 has exceeded the second predetermined fluid temperature threshold, the methodology proceeds to decision block 132. If the temperature of fluid 36 has not exceeded the second predetermined fluid temperature threshold, the methodology proceeds to decision block 136.

At decision block 132, electronic controller 20 determines if power train has been subjected to a load exceeding a predetermined load threshold. The predetermined load threshold may be based on a variety of vehicle dynamics, including the presently engaged gear ratio 50. In the preferred embodiment where Grade Hunting Logic is used, the setting of a grade hunting flag (i.e., a 2–3 grade hunting flag or a 3–4 grade hunting flag) is indicative of the operation of power train 16 under a load which exceeds a predetermined load threshold. If electronic controller 20 determines that power train 16 has not been subjected to a load exceeding a predetermined load threshold, the methodology proceeds to decision block 136. If electronic controller 20 determines that power train 16 has been subjected to a load exceeding the predetermined load threshold, the methodology proceeds to decision block 140.

At decision block 136, the methodology determines if electronically controlled lock-up clutch 38 is engaged. If electronically controlled lock-up clutch 38 is not engaged, the methodology loops back to block 104. If electronically controlled lock-up clutch 38 is engaged, the methodology proceeds to block 138 where a sub-routine for disengaging electronically controlled lock-up clutch 38 is utilized. The methodology of this sub-routine is generally beyond the scope of this disclosure and as such, it will not be discussed in detail. However, it will be understood that employment of this sub-routine will not necessarily cause the disengagement of lock-up clutch 42. For example, where electronically controlled lock-up clutch 38 was engaged in response to the load on power train 16 exceeding the predetermined load threshold, it may be desirable to extend the cooling effect provided by the method of the present invention and as such, the sub-routine would not cause lock-up clutch 42 to disengage until the load on power train 16 diminished below the predetermined load threshold.

At decision block 140, electronic controller 20 determines if power train 16 has been subjected to a load exceeding a predetermined load threshold for a period of time which exceeds a time threshold. As discussed above, the use of the time threshold may be necessary to ensure that vehicle 10 is being operated under steady conditions (e.g., constant vehicle speed) so as to avoid the creation of "driveability" issues. If electronic controller 20 determines that power train 16 has been subjected to a load exceeding the predetermined load threshold for a period of time exceeding the time threshold, the methodology proceeds to block 116 where electronic controller 20 engages electronically controlled lock-up clutch 38, thereby inhibiting relative rotation between turbine 30 and impeller 32 so as to improve fuel economy and reduce the amount of heat created by torque converter 26 while power train 16 is operated under a heavy load. In the preferred embodiment where Grade Hunting Logic is used, this condition is met when a grade hunting flag has been set for a period of time which exceeds the time threshold.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a vehicle having a power train including a hydrodynamic torque converter, said hydrodynamic torque converter having a turbine, an impeller, a fluid and a lock-up clutch for inhibiting relative rotation between said turbine and said impeller, a method for controlling said lock-up clutch comprising the steps of:

monitoring a load on said power train;

monitoring a temperature of said fluid;

determining if said temperature exceeds a predetermined temperature threshold;

determining if said load exceeds a predetermined load threshold;

determining if said load threshold has been exceeded for a time period exceeding a predetermined time interval;

engaging said lock-up clutch if said temperature exceeds said predetermined temperature threshold and said load exceeds said predetermined load threshold for said time period exceeding said time interval.

2. The method for controlling a torque converter lock-up clutch of claim 1 wherein the step of monitoring said load on said power train is performed by the use of Grade Hunting Logic.

3. The method for controlling a torque converter lock-up clutch of claim 2 wherein the step of determining if said load exceeds said predetermined load threshold is performed by setting a grade hunting flag.

4. The method for controlling a torque converter lock-up clutch of claim 1 wherein said predetermined temperature threshold is approximately 180 to 240° F.

5. The method for controlling a torque converter lock-up clutch of claim 4 wherein said predetermined temperature threshold is approximately 190 to 210° F.

6. The method for controlling a torque converter lock-up clutch of claim 1 wherein said predetermined time interval is approximately 0 to 15 seconds.

7. The method for controlling a torque converter lock-up clutch of claim 6 wherein said predetermined time interval is approximately 2 to 6 seconds.

8. In a vehicle having a hydrodynamic torque converter and a gearbox, said hydrodynamic torque converter having a turbine, an impeller, a fluid and a lock-up clutch for inhibiting relative rotation between said turbine and said impeller and said gearbox having a plurality of gear ratios, a method for controlling said lock-up clutch comprising the steps of:

engaging said gearbox in a first gear ratio;

monitoring a temperature of said fluid;

determining a torque required to maintain a predetermined speed in said first gear ratio;

predicting a maximum torque available in an upshift condition of said gearbox to a second gear ratio;

inhibiting an upshift to said second gear ratio when said predicted maximum torque available in said second gear ratio is less than said determined torque required to maintain said predetermined speed in said first gear ratio;

determining if said upshift has been inhibited for a time period exceeding a predetermined time interval;

determining if said temperature of said fluid exceeds a predetermined temperature threshold;

engaging said lock-up clutch if said temperature exceeds said predetermined threshold and said upshift has been inhibited for a time period exceeding said predetermined time interval.

9. The method for controlling a torque converter lock-up clutch of claim 8 wherein said predetermined temperature threshold is approximately 180 to 240° F.

10. The method for controlling a torque converter lock-up clutch of claim 9 wherein said predetermined temperature threshold is approximately 190 to 210° F.

11. The method for controlling a torque converter lock-up clutch of claim 8 wherein said predetermined time interval is approximately 0 to 15 seconds.

12. The method for controlling a torque converter lock-up clutch of claim 11 wherein said predetermined time interval is approximately 2 to 6 seconds.

13. A transmission assembly comprising:

a hydrodynamic torque converter having a turbine, an impeller, a hydrodynamic fluid, a clutch actuator and a lock-up clutch, said lock-up clutch operable between an engaged position inhibiting relative rotation between said turbine and said impeller, and a disengaged position permitting relative rotation between said turbine and said impeller, said clutch actuator operable for selectively positioning said lock-up clutch between said engaged and disengaged positions;

a gearbox having an input shaft, a plurality of gear ratios and an output shaft, said input shaft coupled for rotation with said impeller; and an electronic controller coupled to said clutch actuator, said electronic controller operable for determining a temperature of said hydrodynamic fluid and a load on said output shaft, said electronic controller operable for actuating said clutch actuator to position said lock-up clutch in said engaged position in response to a predetermined operating condition wherein said hydrodynamic fluid temperature exceeds a predetermined fluid temperature, and said load exceeds a predetermined load threshold for a time period exceeding a predetermined time interval.

14. A transmission assembly for a vehicle, said transmission assembly comprising:

a hydrodynamic torque converter having a turbine, an impeller, a hydrodynamic fluid, a clutch actuator and a lock-up clutch, said lock-up clutch operable between an engaged position inhibiting relative rotation between said turbine and said impeller, and a disengaged position permitting relative rotation between said turbine and said impeller, said clutch actuator operable for selectively positioning said lock-up clutch between said engaged and disengaged positions;

a gearbox having an input shaft, a plurality of gear ratios and an output shaft, said input shaft coupled for rotation with said impeller; and an electronic controller coupled to said clutch actuator and operable for monitoring a temperature of said hydrodynamic fluid, determining an amount of torque required to maintain a predetermined speed of said vehicle in said first gear ratio, predicting a maximum torque available in an upshift condition of said gearbox to a second gear ratio, inhibiting an upshift from said first gear ratio to said second gear ratio when said predicted maximum torque available in said second gear ratio is less than said determined torque required to maintain said predetermined speed in said first gear ratio, determining if said upshift has been inhibited for a period of time exceeding a predetermined time interval, and determining if said temperature exceeds a predetermined temperature threshold;

said electronic controller causing said actuator to actuate and position said lock-up clutch in said engaged position, when said upshift inhibit period exceeds said predetermined time interval and said temperature exceeds said predetermined temperature threshold.

* * * * *